United States Patent
Simske et al.

(10) Patent No.: US 12,130,265 B2
(45) Date of Patent: Oct. 29, 2024

(54) ROBOTIC ARM NANOINDENTING FOR MATERIAL VALIDATION, MASS SERIALIZATION, ENHANCED JOINING, AND FORENSIC IDENTIFICATION

(71) Applicant: Colorado State University Research Foundation, Fort Collins, CO (US)

(72) Inventors: Steve Simske, Fort Collins, CO (US); Katrina Weinmann, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 346 days.

(21) Appl. No.: 17/706,989

(22) Filed: Mar. 29, 2022

(65) Prior Publication Data

US 2022/0307957 A1 Sep. 29, 2022

Related U.S. Application Data

(60) Provisional application No. 63/167,306, filed on Mar. 29, 2021.

(51) Int. Cl.
*G01N 3/42* (2006.01)
*B25J 15/00* (2006.01)

(52) U.S. Cl.
CPC ............ *G01N 3/42* (2013.01); *B25J 15/0019* (2013.01)

(58) Field of Classification Search
CPC ............... G01N 3/42; G01N 2203/0286; B25J 15/0019; B25J 11/00
See application file for complete search history.

(56) References Cited

U.S. PATENT DOCUMENTS

| | | | |
|---|---|---|---|
| 7,089,420 B1* | 8/2006 | Durst ...................... | H04L 9/32 380/54 |
| 7,175,095 B2 | 2/2007 | Pettersson et al. | |
| 7,377,181 B2* | 5/2008 | Christ, Jr. ............... | G01L 1/247 73/800 |
| 8,655,602 B2* | 2/2014 | Sawa ....................... | G01N 3/42 702/41 |
| 9,363,083 B1* | 6/2016 | Durst ..................... | H04L 9/3236 |
| 10,291,411 B1* | 5/2019 | Durst ....................... | H04L 9/32 |
| 2003/0060987 A1* | 3/2003 | Dao ........................ | G01N 3/42 702/42 |
| 2007/0209447 A1* | 9/2007 | Christ, Jr. ............... | G01L 1/247 73/800 |

(Continued)

OTHER PUBLICATIONS

E. Hintsala, U. Hangen, D. Stauffer, "High-Throughput Nanoindentation for Statistical and Spatial Property Determination", JOM 70, 494-503 (2018).

(Continued)

*Primary Examiner* — Freddie Kirkland, III
(74) *Attorney, Agent, or Firm* — Meunier Carlin & Curfman LLC

(57) ABSTRACT

A method for indentation of physical items may include forming, via an indenter, a plurality of first indents in a first surface of a first physical item, and validating a first material of the first physical item based at least in part on the first indents. The first indents may be disposed within a first defined region of the first surface and arranged in a first encoded pattern corresponding to a first item-specific serialization code for the first physical item.

20 Claims, 5 Drawing Sheets

(56) References Cited

U.S. PATENT DOCUMENTS

| | | | | |
|---|---|---|---|---|
| 2012/0241515 A1* | 9/2012 | Freeman | ............... | B42D 25/30 |
| | | | | 235/494 |
| 2013/0306737 A1* | 11/2013 | Freeman | ............ | G06K 19/0614 |
| | | | | 235/494 |
| 2022/0242160 A1* | 8/2022 | Gaathon | ................... | G07D 7/12 |
| 2023/0289947 A1* | 9/2023 | Tasan | ....................... | G01N 3/46 |

OTHER PUBLICATIONS

S. Klein, G. Adams, F. Dickin, S. Simske, "3D Printing: When and where does it make sense?", NIP & Digital Fabrication Conference, 2013 Int. Conf. on Digital Printing Technologies, 5-8 (2013).

C. Sanchez-Camargo, A. Hor, M. Salem, C. Mabru, "A Robust Method for Mechanical Characterization of Heterogeneous Materials by Nanoindentation Grid Analysis", Materials & Design, 194 (2020).

G. Adams, S. Pollard, S. Simske, "High Resolution Imaging for Forensics and Security," 2010 International Conference on Digital Printing Technologies, 372-376 (2010).

A. Goddard, A. Hillman, J. Bond, "High Resolution Imaging of Latent Fingerprints by Localized Corrosion on Brass Surfaces", Journal of Forensic Sciences, 55, 58-65 (2010).

S. J. Simske, et al., "An imaging system for simultaneous inspection, authentication and forensics," 2010 IEEE International Conference on Imaging Systems and Techniques, Thessaloniki, 2010, pp. 266-269, doi: 10.1109/IST.2010.5548453.

C.A. Schuh, Nanoindentation studies of materials: Materials Today vol. 9, No. 5 (May 2006), pp. 32-40 doi: 10.1016/s1369-7021(06)71495-x (https://www.sciencedirect.com/science/article/pii/S136970210671495X).

Karl Goldberg, Tables of Binomial Coefficients and Sterling Nos. Journal of Research of the Notional Bureau of Standards—B. Mathematical Sciences vol. BOB, No. 1, Jan.-Mar. 1976 Tables of Binomial coefficients and Sterling numbers (nist.gov).

Katrina J Weinmann, Hardness Testing Process for Enhanced Joining, Material Validation, and Mass Serialization. https://doi.org/10.2352/ISSN.2169-4451.2021.37.65 © 2021 Society for Imaging Science and Technology.

* cited by examiner

MAXIMUM INDENTING AREA

FIG. 7A

MINIMUM ADHESION AREA

FIG. 7B

| 1 | 1 | 1 | 0 |
|---|---|---|---|
| 0 | 1 | 0 | 0 |
| 0 | 0 | 1 | 0 |
| 1 | 1 | 0 | 1 |

ROBOTIC ARM NANOINDENTING FOR MATERIAL VALIDATION, MASS SERIALIZATION, ENHANCED JOINING, AND FORENSIC IDENTIFICATION

CROSS-REFERENCE TO RELATED APPLICATIONS

This application claims the benefit of, and priority to, U.S. Provisional Patent Application No. 63/167,306, filed on Mar. 29, 2021, and titled "Robotic Arm Nanoindenting Applied to Validation, Authentication, and Forensics," the disclosure of which is expressly incorporated herein by reference in its entirety.

FIELD OF THE DISCLOSURE

The present disclosure relates generally to indentation of physical items and more particularly to use of a robotic arm for indentation, such as nanoindentation, of physical items, such as additive manufactured items, for purposes of material validation, mass serialization, enhanced joining, and/or forensic identification.

BACKGROUND OF THE DISCLOSURE

Robotic arms are increasingly incorporated into various types of manufacturing. In traditional mass production environments, robotic arms may be used to provide assistance to human workers and for automation. In custom manufacturing and additive manufacturing arenas, robotic arms may be used to help perform the changing set of tasks required for assembly and finishing.

Additive manufacturing can provide many advantages over traditional subtractive and molding-based manufacturing methods, such as the ability to produce parts with complex internal geometries and the ability to quickly produce custom parts without changes in manufacturing setup. However, additive manufactured parts may face a unique set of post-processing challenges. One of these challenges may be material validation. With subtractive or molding-based manufacturing, the material properties typically are validated prior to manufacturing. For additive manufacturing, the material properties of the manufactured part often are affected by the 3D print settings, so the properties may need to be validated after the additive manufacturing process. Additionally, due to different surface properties, joining of additive manufactured parts can be challenging. Finally, while additive manufacturing may greatly reduce cycle times for manufacturing custom parts, this may present a challenge for post-processing, as it may be difficult to use a static set-up for material validation and other post-processing operations for parts of a variety of shapes and sizes. This introduces the need for a flexible post-processing configuration that can accommodate a wide variety of parts with minimal changes in set-up between different parts.

As additive manufacturing enables custom manufacturing to become more mainstream, validation of multiple materials on multiple surfaces may be important. Also, additive manufacturing can be used to produce specific-use accessories suitable for the custom manufactured goods. See E. Hintsala, U. Hangen, D. Stauffer, "High-Throughput Nanoindentation for Statistical and Spatial Property Determination", JOM 70, 494-503 (2018). These accessories can even be single-use because many additive manufacturing processes feature the recycling of the materials. Additive manufacturing can also be used for de-customization of customized parts to allow them to fit into existing mass production lines. In this case, the accessories that are additively manufactured might be sprues or container elements allowing the custom parts to fit into the constraints of the existing production line. In each of these cases, being able to approach surfaces of different morphologies for the purpose of inspection, quality assurance (QA), and quality control (QC) may be advantageous.

There remains a need for improved techniques for post-processing of manufactured parts, such as additive manufactured parts, which may overcome one or more of the drawbacks associated with existing techniques.

SUMMARY OF THE DISCLOSURE

The present disclosure provides methods for indentation, such as nanoindentation, of physical items, such as additive manufactured items, for purposes of material validation, mass serialization, enhanced joining, and/or forensic identification. In one aspect, a method for indentation of physical items may include forming, via an indenter, a plurality of first indents in a first surface of a first physical item, and validating a first material of the first physical item based at least in part on the first indents. The first indents may be disposed within a first defined region of the first surface and arranged in a first encoded pattern corresponding to a first item-specific serialization code for the first physical item.

In some embodiments, the indenter may be mounted to a robotic arm, and forming, via the indenter, the plurality of first indents in the first surface of the first physical item may include using the robotic arm to move the indenter relative to the first physical item. In some embodiments, the indenter may be a nanoindenter, and wherein the first indents may be nanonindents. In some embodiments, the first physical part may be an additive manufactured part.

In some embodiments, the first defined region may include a grid including a plurality of first grid regions each containing one of the first indents and a plurality of second grid regions without any indents contained therein. In some embodiments, the first encoded pattern may follow an equi-digit coding scheme such that a number of the first grid regions is equal to a number of the second grid regions. In some embodiments, the first item-specific serialization code may be a binary string. In some embodiments, validating the first material of the first physical item based at least in part on the first indents may include determining a hardness of the first material. In some embodiments, determining the hardness of the first material may include determining an average depth of the first indents, and calculating the hardness of the first material based at least in part on the average depth of the first indents. In some embodiments, determining the hardness of the first material may include determining an average size of the first indents, and calculating the hardness of the first material based at least in part on the average size of the first indents. In some embodiments, determining the average size of the first indents may include capturing an image of the first indents, and analyzing the image to determine the average size of the first indents. In some embodiments, determining the hardness of the material may include determining an angle of approach of the indenter to the first physical item relative to a direction of gravity in forming the first indents, determining an average size of the first indents, and calculating the hardness of the material based at least in part on the angle of approach, the average size of the first indents, and a calibration curve of indent size as a function of angle of approach.

In some embodiments, the method also may include joining the first physical item and a second physical item such that the first surface of the first physical item is adhered or bonded to a second surface of the second physical item and such that the first defined region of the first surface is covered by the second surface. In some embodiments, the method also may include, prior to joining the first physical item and the second physical item, forming, via the indenter, a plurality of second indents in the second surface of the second physical item, with the second indents being disposed within a second defined region of the second surface and arranged in a second encoded pattern corresponding to a second item-specific serialization code for the second physical item, and with the first defined region of the first surface being covered by the second defined region of the second surface. In some embodiments, each of the first encoded pattern and the second encoded pattern may follow an equidigit coding scheme. In some embodiments, the second encoded pattern may complement the first encoded pattern such that none of the second indents overlap any of the first indents. In some embodiments, the method also may include, prior to joining the first physical item and the second physical item, validating a second material of the second physical item based at least in part on the second indents.

In some embodiments, the method also may include forensically identifying the first physical item based at least in part on one or more attributes of one or more of the first indents in a manner such that a chance of false identification is less than one in a billion. In some embodiments, the one or more attributes may include one or more of: locations of the one or more of the first indents, orientations of the one or more of the first indents, sizes of the one or more of the first indents, and edge variations of the one or more of the first indents. In some embodiments, forensically identifying the first physical item based at least in part on the one or more attributes of the one or more of the first indents may include capturing an image of the first indents, and analyzing the image to determine the one or more attributes of the one or more of the first indents.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

FIG. 7A is a schematic diagram of example encoded patterns of a plurality of indentations and absence of indentations arranged in respective grids with the patterns repeating, showing a maximum indenting area, as may be used in accordance with embodiments of the disclosure. FIG. 7B is a schematic diagram of the example encoded patterns of the plurality of indentations and absence of indentations of FIG. 7A, showing a minimum adhesion area, as may be used in accordance with embodiments of the disclosure.

Figure 1:
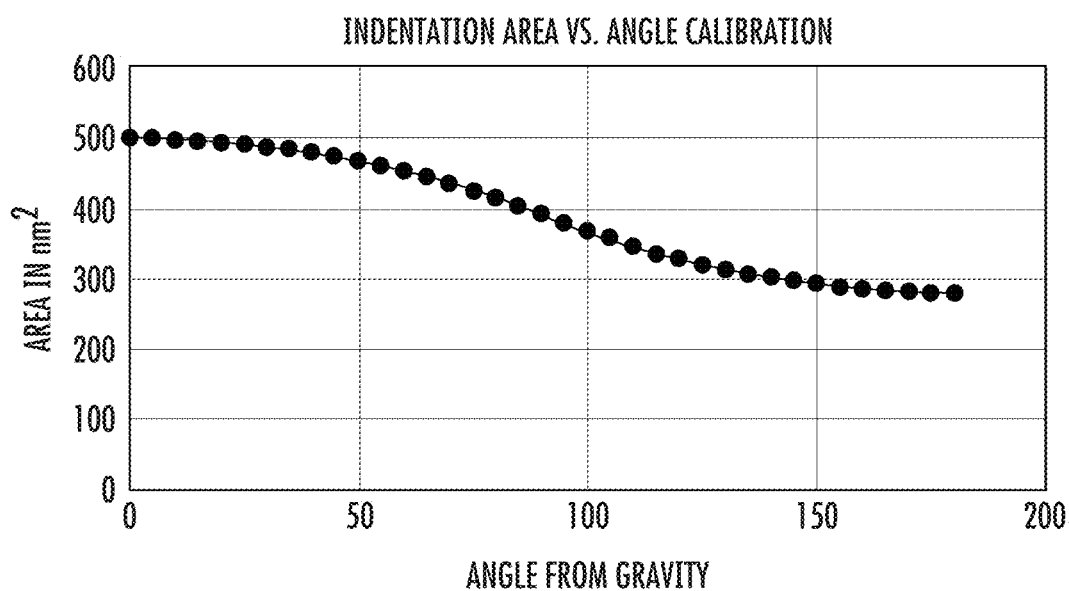
FIG. 1 illustrates an example calibration curve of indentation area as a function of angle of approach of an indenter to a physical item relative to a direction of gravity, as may be used in accordance with embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, and/or components have not been described in detail so as not to unnecessarily obscure aspects of the embodiments.

Overview

The present disclosure provides embodiments of a four-fold hybrid custom manufacturing validation process, extending from inspection to authentication to forensic validation, which may be carried out using a robotic-arm supported sensor and a nano-indenter. The methods described herein may be particularly advantageous for post-processing of additive manufactured items, however, the methods are not limited for use with additive manufactured items. Indeed, the disclosed methods may be used for post-processing of any physical item manufactured by various techniques, as desired. As described herein, the disclosed methods may be used for simultaneously: (1) validating a material used in manufacturing; (2) encoding and decoding intentional identifying information at the surface of the material (which may be an interface between two layers in a joining process during multi-step manufacturing); (3) using identifying information for an advantageous purpose, such as promoting adhesion, binding, or joining during manufacturing; and (4) providing loci for forensic authentication of the specific item.

As described in detail below, present disclosure provides embodiments of methods for the simultaneous provision of material validation, mass serialization, and binding enhancement using a portable hardness tester for 3D printed parts. The described processes may be implemented using a robotic arm-mounted hardness tester for ease of integration into a manufacturing environment, and adaptability of the process for custom parts. Hardness testing can be used for material validation, with the process of hardness testing leaving an indent in the material where the test is performed. Thus, the indents may be placed where they do not affect desired aesthetics, or else coupled with another desired process. By administering the hardness tests in a specified pattern on the material, the indents created on the material may be used for two additional functions—increasing the surface area to enhance joining, and marking an item-specific serialization code on the part, which can be used for later identification. The post-processing of 3D printed parts can be streamlined by completing these three objectives in a single process that is highly adaptable to customized manufactured parts through an implementation using a robotic arm.

Hardness testing, such as nanoindentation, often is used for material validation (see S. Klein, G. Adams, F. Dickin, S. Simske, "3D Printing: When and where does it make sense?", NIP & Digital Fabrication Conference, 2013 Int. Conf. on Digital Printing Technologies, 5-8 (2013).) and surface characterization (see C. Sanchez-Camargo, A. Hor, M. Salem, C. Mabru, "A Robust Method for Mechanical Characterization of Heterogeneous Materials by Nanoindentation Grid Analysis", Materials & Design, 194 (2020).), but these indents have not been used for any purpose in addition to material evaluation. As a consequence, these tests generally have been performed on nonvisible surfaces, when possible. The methods provided herein may leverage the indents made by hardness testing for two additional functions. As described, a process by which nanoindentation appropriate to the materials used in manufacturing (including polymers and metals) may be used for the simultaneous achievement of material validation, increasing the surface area between two joined elements to enhance bonding/adhesion, and material mass serialization labeling for item-level tagging. Combined, this process may provide several important functionalities and also may provide indentation marks that may be suitable for forensic-level authentication using high-resolution imaging (see G. Adams, S. Pollard, S. Simske, "High Resolution Imaging for Forensics and Security," 2010 International Conference on Digital Printing Technologies, 372-376 (2010); A. Goddard, A. Hillman, J. Bond, "High Resolution Imaging of Latent Fingerprints by Localized Corrosion on Brass Surfaces", Journal of Forensic Sciences, 55, 58-65 (2010).), among other approaches.

Example Methods, Devices, and Systems
Material Validation

Material hardness is strongly correlated with elastic modulus and thus can be used as a method of material validation. Material validation may be especially important for additive manufactured parts, wherein the degree of QA and QC may vary considerably between the different parties involved in the manufacture of all the different elements of an item. Material characterization may include ensuring sufficient density, validating 3D print settings, and using sensors to ensure that the desired material properties are achieved. There are various methods of hardness testing in use, with the two most common being Rockwell hardness testing and Leeb rebound hardness testing. Rockwell hardness testing is performed by pressing an indenter tip into the material being tested with a known force. The size of the indent is then measured and used to calculate the hardness of the material. Leeb rebound testing is a dynamic test that uses an impact probe, and measures the initial velocity before impact and rebound velocity after impact with the material to calculate the material hardness. Both of these types of hardness testing leave an indent in the material where the test is performed. There are various other methods of hardness testing as well, and the preferred method of hardness testing typically depends on the material being tested and the geometry of the object (not to mention whether an indent is allowable on the surface for reasons including integrity and aesthetics). Generally, the two methods described above work better when applied to large, metal parts with large flat surfaces for testing.

Many 3D printed parts are small, plastic, and/or have complex geometries which lack the large, flat surfaces typically employed for hardness testing. As described below, experiments were conducted using two different types of portable hardness testers that are designed for use on small, thin objects. Specifically, a durometer and an ultrasonic contact impedance (UCI) hardness tester were used for the respective experiments. The durometer measures the depth of an indent in a material from a known applied force to determine the hardness of a material. The ultrasonic contact impedance method of hardness testing measures the difference in ultrasonic frequencies generated from a vibrating diamond tip indenter being pressed into the material at a fixed load to measure material hardness. These portable hardness testers were chosen for their ability to be used on small objects and the relatively small size of the test actuator, allowing the hardness tests to be administered using a robotic arm, and decreasing the flat surface area needed for the hardness tests.

Another concern with using hardness testing for material validation of additive manufactured parts is the lack of surface uniformity and relatively high surface roughness. Hardness testing traditionally is performed on flat, finished surfaces to ensure accuracy of the hardness measurement. However, it may be undesirable to add a manufacturing operation to finish a surface for the sole purpose of preparing the surface for hardness testing. Accordingly, several hardness tests may be administered on the same surface to provide an average hardness value that is sufficiently accurate for material validation. This approach may eliminate the need for surface finishing because any individual hardness reading variations due to surface roughness or anomalies may be averaged out by the Central Limit Theorem. Thus, this approach may provide a material validation step that can be performed using the appropriate effector (human, robotic arm, etc.) for the process being performed.

Material validation may be performed by measuring the depth of indentation (modulus inferred), or equivalently the size of the indent into the material, usually with a time specification and/or time limit (e.g., 10-15 seconds). In some embodiments, as in typical nanoindentation measurements, the indenter may be lowered onto the surface of the item, for which a fully calibrated (i.e., accounting for the directionality of gravity, the relative weight of the indenter, etc.) situation exists. However, in some embodiments, the nanoindentation may occur at an angle other than 0 degrees (from the direction of gravity), and thus a calibration curve for the size of nanoindentation versus the angle of approach of the nanoindenter to the material may be utilized.

Figure 2:
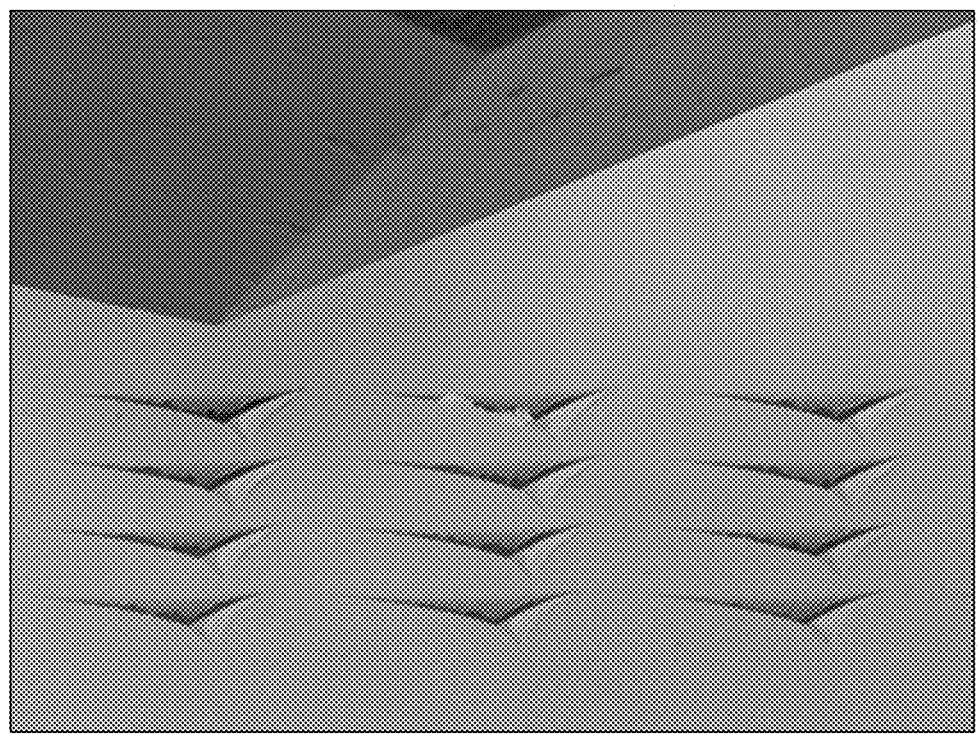
FIG. 2 is a perspective view of an example of a plurality of nanoindentations formed in a physical item using an indenter, showing the variability of the nanoindentations formed using the same indenter.

FIG. 1 illustrates an example calibration curve as may be used in accordance with embodiments of the disclosure. According to the illustrated example, when an indentation is formed straight down (i.e., with an angle of approach of 0 degrees relative to the direction of gravity), the indentation is expected to be 500 $nm^2$. However, when an indentation is formed with an angle of approach of 90 degrees relative to the direction of gravity, the indentation is expected to be 390 $nm^2$. Thus, measuring 390 $nm^2$ for a fully horizontal indentation implies a 500 $nm^2$ indentation at the traditional, vertical direction, and a material is validated by knowing the angle of approach, the size of the indentation, and the calibration curve. The size of the indentation may be determined from an image of the indentation captured after the indentation is performed. As discussed below, the image also may allow for later image analysis evaluation of the indentation to serve as forensic validation. By using a calibration curve, this approach allows for omnidirectional angle of surface indentation and the use of the nanoindentation to validate the material at the surface of the manufactured/assembled good, where any possible angle of approach may be required based on the processes and set up of the manufacturing environment. As shown, the calibration curve of FIG. 1 is smooth. However, due to variabilities in surface finish in the nanoindentation results, some degree of variance for the indentations may be obtained. This variance may be addressed through the use of a plurality of indentations, which also may afford encoding of a particular coded pattern on the surface, as described below. FIG. 2 shows an example of a plurality of nanoindentations formed in a surface of an item using an indenter, showing the variability of the nanoindentations formed using the same indenter. See S. J. Simske, et al., "An imaging system for simultaneous inspection, authentication and forensics," 2010 IEEE International Conference on Imaging Systems and Techniques, Thessaloniki, 2010, pp. 266-269. Evaluation of the calibration of indention area versus angle of indentation, as shown in FIG. 1, has the potential to identify specific material properties. Additionally, the coefficient of variance (COV) (ratio of standard deviation to mean) determined by the variability at each angle, may be used to preclude certain ranges of angles for different materials (e.g., the high COV may arise from the crystalline properties of the material, for instance). The COV also may indicate porosity and/or homogeneity of the material.

Figure 3:
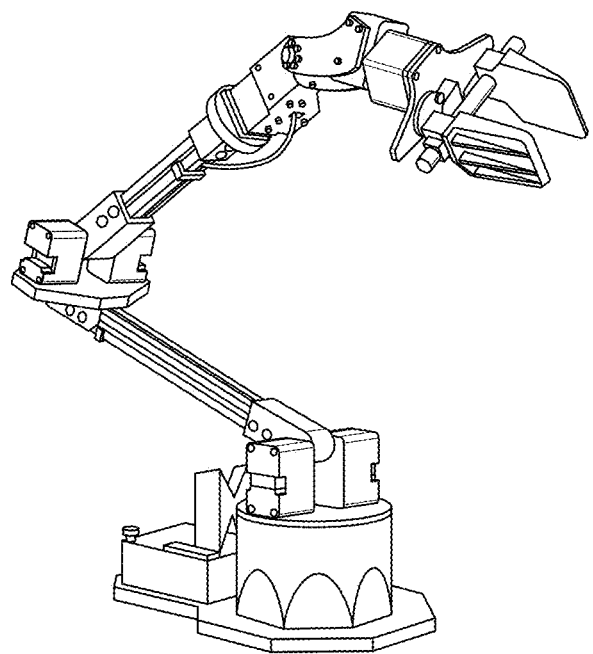
FIG. 3 is a perspective view of an example robotic arm as may be used in accordance with embodiments of the disclosure.

It is envisioned that the processes described herein may be incorporated while either rotating the physical item or rotating the robotic arm. Depending on the environment in which the robotic arm is utilized, either (a) the item whose surface is being validated may be moved or (b) the robotic arm may be moved to meet the surface. In many industrial environments, the item may be held by another robotic arm, a conveying system, or other means of manipulation. However, in many cases, rotating the sensor (e.g., the nanoindenter attached to the robotic arm) may be preferable due to the lower payload mass on the arm compared to many manufactured or otherwise manipulated items, a single source of positional area that can be calibrated for directly, and the robotic arm's flexibility for position and orientation. Regardless, it is envisioned that the robotic arm may be used in at least some instances to position the nanoindenter in proper perpendicular orientation to the surface. Various types of robotic arms may be used, depending on the particular application. FIG. 3 illustrates an example robotic arm as may be used in accordance with embodiments of the disclosure. In some embodiments, as shown, the robotic arm may be a 6-degrees-of-freedom robotic arm.

Figure 4:
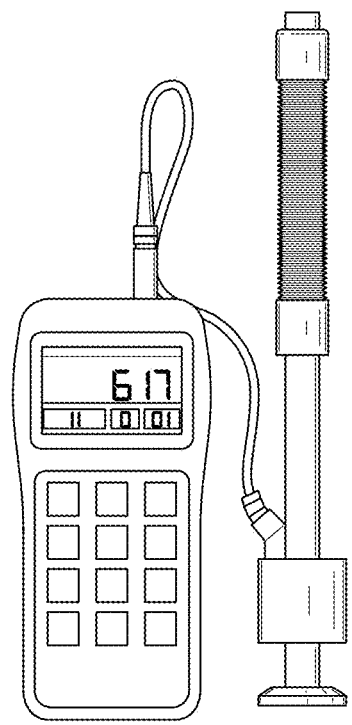
FIG. 4 is a plan view of an example indenter probe and portable recording module as may be used in accordance with embodiments of the disclosure.
Figures 5, 6:
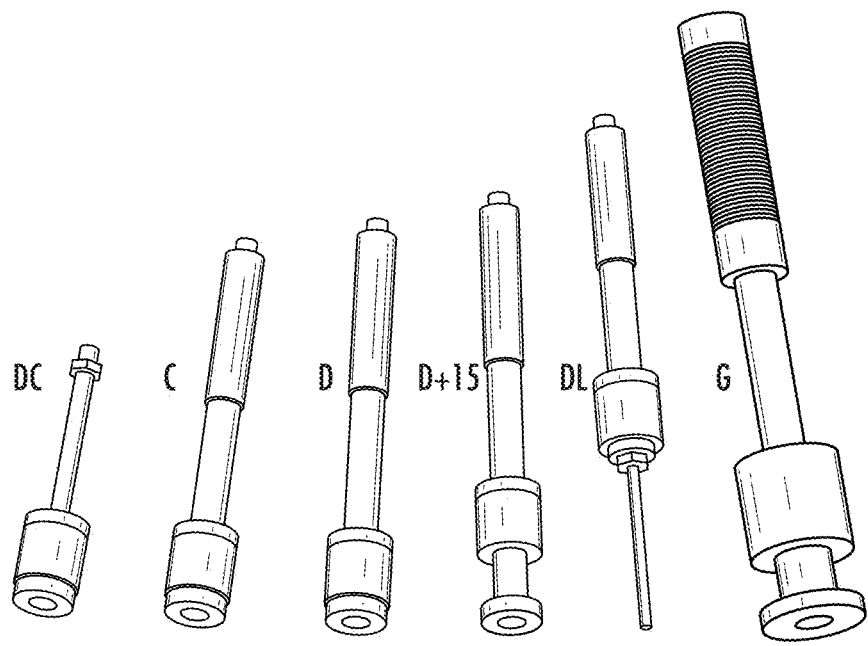
FIG. 5 is a perspective view of a plurality of example impact devices for portable hardness testing, as may be used in accordance with embodiments of the disclosure.
FIG. 6 is a schematic diagram of an example encoded pattern of a plurality of indentations and absence of indentations arranged in a grid, as may be used in accordance with embodiments of the disclosure.

Various types of indenters may be used for forming indents in a surface of a physical item and determining a hardness of a material of the item for material validation. FIG. 4 illustrates an example indenter probe and portable recording module as may be used in accordance with embodiments of the disclosure. FIG. 5 illustrates a several different example impact devices for portable hardness testing, as may be used in accordance with embodiments of the disclosure. Various types of portable hardness testers may be used for carrying out the methods described herein. Typical hardness testing may involve microindenting or nanoindenting through the application of the indenter to the surface with a specified force which creates a mark, followed by measurement of the size of the indent mark (not the indentation) using a separate imaging system (e.g., such as the Leeb rebound test). The processes described herein may simultaneously perform material validation by measuring the size of the indent and forensics of the actual indentation images for any indenting process (because the Leeb rebound test does not provide an area-based forensic). The optimal indenter for a particular application generally may be a function of the material, direction of approach, and size of the indentations.

Mass Serialization

Providing security for a physical item generally may require three elements: (1) mass serialization, in which a unique identifier is placed on each item; (2) copy prevention, in which a physical mark used for authentication deteriorates in a measurable way when an attempt to replicate it occurs; and (3) tamper-evidence, wherein administering hardness tests in a specified pattern of locations allows the indents to be used as a barcode (data bearing patterned mark). Using a specified grid spacing, indents may be placed at locations in the grid corresponding to a desired, item-specific serialization code. The barcodes can be represented by a binary string, where a "1" is represented by a grid location with an indent, and a "0" is represented by a grid location without an indent. When the code is read line by line, top to bottom, it can be represented by a "1" binary string that matches the serialization code for the item.

Authentication of the encoded pattern of nanoindentations placed in a region of the surface may be done through decoding the patterns of indentations (binary 1's) and lack of indentations (binary 0's) in an area on the surface (e.g., a square or other shape). The nanoindenter may be used to encode intentional information at the surface—at each possible location for indentation, placing an indentation "writes" a "1", while not placing an indentation "writes" a "0". In some embodiments, for the purposes of later manufacturing advantages and ease of decoding, an equidigit coding scheme may be used, in which each legitimate binary string to be written has an equal number of 1's and 0's, as described further below.

Authentication variability may differ depending on the nature of the surface's finish (or lack thereof). Variable surface finishes may affect the results (e.g., size) of the nanoindenting. Additionally, nonuniformities in the material, including aggregate materials or anisotropic materials (consistent with additive manufacturing), may add variability to the readings. The use of encoding patterns, however, may resolve the potential discrepancy. Because a specified number of indentations will be made (once the total number of bits is decided on, half of that number will be indentations), the accuracy of the mean indenter size naturally will improve by a factor of the square root of this number of indentations by the Central Limit Theorem of statistics. For specific, endemic non-uniformities, a separate calibration may be used to further improve the accuracy of the estimate.

As discussed above, the authentication code may use an equidigit encoding scheme, in which the number of 0's and the number of 1's are equivalent. This also may be advantageous for the predictable amount of binding/adhesion surface and volume (in joining applications, as described below) and for ease of reading (i.e., the use of half 0's and half 1's should enhance readability). As one example, if the codes are placed in 2×2 regions, then n=4, and the six strings 0011, 0101, 0110, 1001, 1010, and 1100 have equal numbers of 1's and 0's. Because there are 16 possible strings, $6/16=3/8=0.375$ (or 37.5%) of the possible strings are legitimate. This comes from the following tier in Pascal's triangle: 1 4 6 4 1. As another example, if the codes are placed in 3×2 regions, then n=6, and there are 20 strings with 3 each of binary 0's and 1's, out of 64 total strings, and thus $5/16$ (0.3125)=31.25% of the possible strings are legitimate. This comes from the following tier in Pascal's triangle: 1 6 15 20 15 6 1. For n=16, the following tier is used: 1 16 120 560 1820 4368 8008 11440 12870 11440 ... 16 1. This results in 12870/65536=0.1964, or 19.64% of all the codes having equal numbers of 0's and 1's.

In general, for n=N, where N is even, $(N!)/((N/2)!(N/2)!)$ strings have half 0's and half 1's, out of $2^N$ total strings. For N=64, which is arranged as an 8×8 region grid, this is (64 32)=1 832 624 140 942 590 534$/2^{64}$=0.09934675, or just under 10% of the possible strings. In other words, equidigit coding results in a predictable number of indentations, having a specific number for forensics and for binding, while also having nearly the same amount of variations as unqualified binary strings (10% as much for 64 bits). One such example (32 X and 32 no-X) is shown in FIG. 6, in which each "X" represents an indent. Each "X" can be used as a forensic, in addition to a code. The code for the below is given by replacing the X with 1, the non-X with 0, and is thus:
"1010101010001111101101001101001101010100000110111010011001010100".

Figures 7A, 7B:
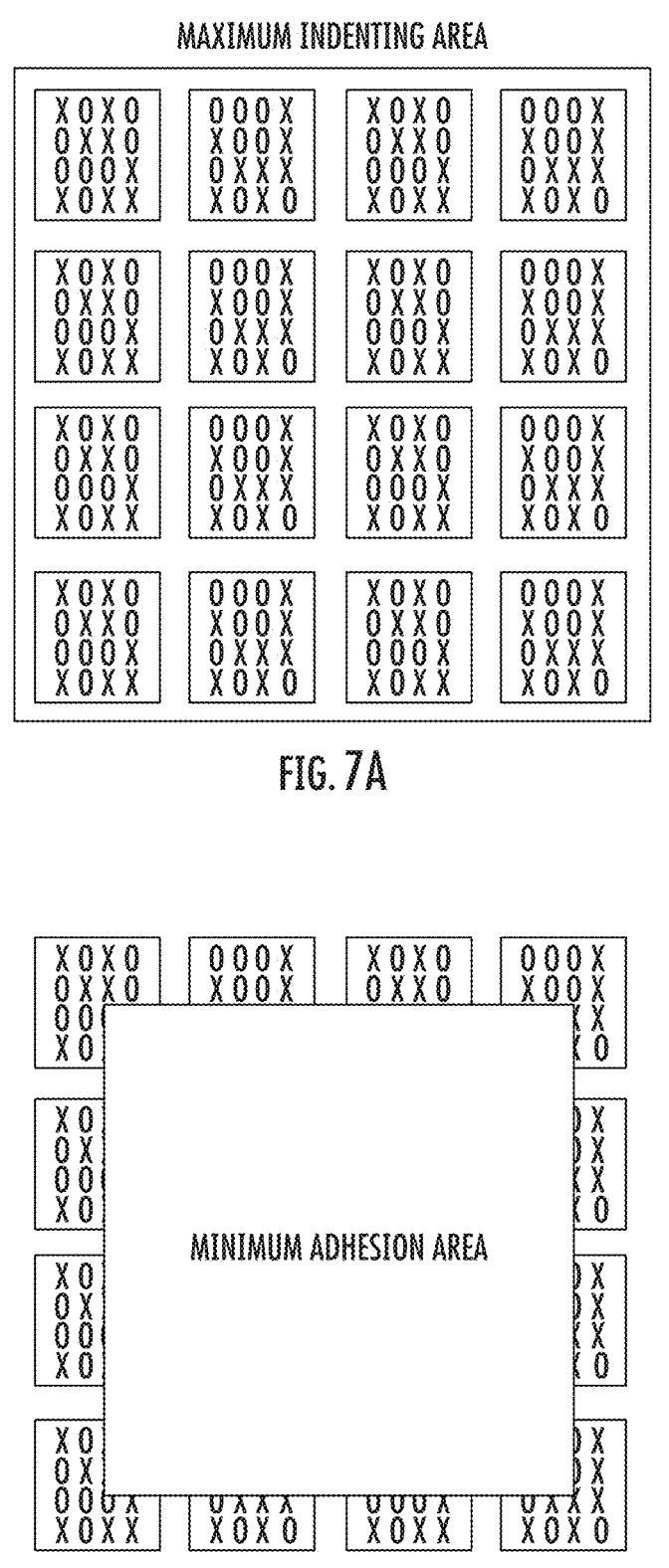

As shown in FIG. 6, the actual pattern of indentations may be rolled out in cells (or macro-tiles comprised of usually N×N loci where there is either an intent or the unblemished surface—no indent—at a 1:1 ratio). This approach may have multiple advantages. First, individual cells can be read for partial authentication (e.g., in FIG. 6, there are 64 bits of authentication). Second, patterns can be repeated once sufficient serialization is assumed, providing redundancy across a "maximum indenting area" (a specific area on the surface where indents may be written). Such redundancy is shown in FIG. 7A, where there are only two unique cells, repeated 8 times across the maximum indenting area. Third, the cells can be made to extend beyond the "minimum adhesion area" required to bind two layers of material. This is shown in FIG. 7B, where the maximum indenting area and the minimum adhesion area are shown as they align. So long as the minimum adhesion area does not extend over more than half of any cell on its perimeter (there are 16 cells, each containing 16 bits, of which 8 are 1's and 8 are 0's in FIG. 7B), then there will be no lack of coverage of the minimum adhesion area with sufficient adhesion force. That is, the convex hull around the actual indentations may be at least as large as the minimum adhesion area when alignment as in FIG. 7B occurs. This may ensure a minimum binding area, which generally may be important in a layer-layer adhesion manufacturing quality assurance (QA) process.

Enhanced Joining

A manufacturing advantage gained by nanoindentation may be similar to that gained by abrading or sanding a surface: adding surface roughness increases the surface area for better adhesion, binding, joining, etc. The use of an equidigit coding may ensure a specific adhesion, binding, or joining situation, as each individually marked surface has a unique identifier. Each material surface having the same number of nanoindentations (while having the same material composition) may have the expectation of increased adhesion or binding energy uniformly distributed across the products (affording quality assurance). In this manner, the secondary purpose of the authentication may be to ensure uniform area and volume for "traction" in adhesion. In some embodiments, only one of two physical items being joined may have indentations on a surface being joined. In some embodiments, each of two physical items being joined may have indentations on the respective surfaces being joined. In some such embodiments, the indentations on the respective surfaces of the items may be complementary indentations, such that each of the indentations of one of the items may be aligned with a portion of the other item lacking an indentation, and vice versa. In other words, the indentations of the items may be arranged such that none of the indentations of one of the items overlaps with any of the indentations of the other item, and vice versa. Using a complementary approach may double the density of indentations to maximize surface area for binding/adhesion and allow either item to be authenticated. In some embodiments, one of the items being joined may have indentations, and the other item may have raised marks for aligning with the indentations, for example, to provide improved shear properties. This binding approach may require very high alignment accuracy, considering how small the indents may be.

Performing several hardness tests on the surface of an item may have the function of increasing the surface area available for bonding through the indents created by the hardness tests. The size, shape, and spatial density of the indents may determine how much increased surface area is available for joining. Using the material validation surface for bonding may have the added benefit of either hiding the validation marks (if bonded to a solid material) or providing tamper protection for the serialization described above (if bonded to a transparent material or forensically analyzed after failure or seizure of the object for investigatory purposes).

The spatial density of the indents may be dependent on the capabilities of the robotic arm administering the hardness tests. As discussed below with respect to experimental data, the shape of the indents created by hardness testing may be specific to the hardness tester used, and the size of the indent may be affected by both the type of hardness tester and the hardness of the material being tested.

Forensic Identification

In addition to the use of the indents for mass serialization, images of the indents also may be used for forensic identification of parts. Variations in indent placement with respect to centered grid locations, indent orientation, indent size, and edge variations all may provide identifying features unique to each indent. Each serialization code may contain several indents, each with unique identifying features, which when combined together may provide a very high level of forensic security. Forensic security may provide copy prevention and tamper evidence simultaneously because the marks cannot be copied and will not be authenticated if they have been tampered with.

Specific attributes coincidental with the completion of the indentation may be determined using high-resolution image analysis, as originally described in S. J. Simske, et al., "An imaging system for simultaneous inspection, authentication and forensics," 2010 IEEE International Conference on Imaging Systems and Techniques, Thessaloniki, 2010, pp. 266-269, doi: 10.1109/IST.2010.5548453. The nanoindentation may be used to create a manufacturing step with sufficient image "entropy" to enable forensic identification of the individual indentation. Because of the size of the nanoindentation (or microindentations, if a more abraded surface is required), each indentation may provide several hundred bits of unique content, sufficient for well less than 1 in a billion false positive matches generally required for forensic validation (and that much lower if multiple indentations are authenticated simultaneously). As noted above, FIG. 2 illustrates an example of nanoindentation variability. Additionally, the relative location of the indentations may also be a unique forensic element, and the relative spacing may vary within the repeatability limits of the arm.

EXPERIMENTAL EXAMPLES

Experiments were conducted on acrylic, polycarbonate, and copper items using two different types of portable hardness testers designed for use on small, thin objects. A Phase II PHT-980 Digital Shore D Durometer was used for the acrylic and polycarbonate items, and a Phase II PHT-6005 UCI (ultrasonic contact impedance) hardness tester with a 5 kgf probe was used for the copper items. Each of these testers is suitable for material thicknesses as low as 2 mm, which means 20 layers at 100 microns/layer. These portable hardness testers were chosen for their ability to be used on small objects and the relatively small size of the test actuator, giving the ability to administer the hardness tests using a robotic arm, and decreasing the flat surface area needed for the hardness tests.

Figures 8A, 8B:
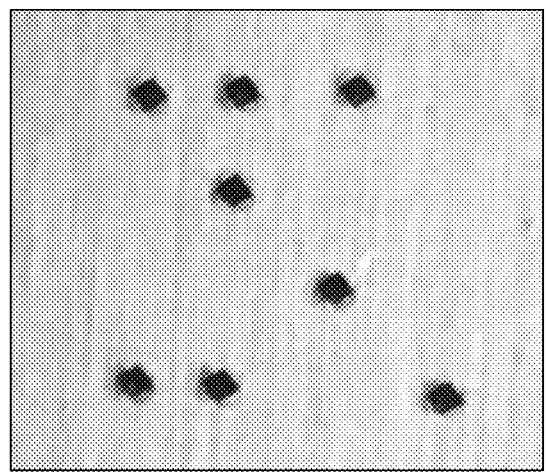
FIG. 8A is a plan view of an example encoded pattern of a plurality of indentations and absence of indentations arranged in a grid, as may be used in accordance with embodiments of the disclosure.
FIG. 8B is a schematic diagram of the example encoded pattern of the plurality of indentations and absence of indentations of FIG. 8A.

A variety of codes were marked on surfaces of the acrylic, polycarbonate, and copper items. The codes were then imaged and analyzed to verify accurate identification of the indents marked by the hardness testers. The purpose of this experiment was verification of the ability to identify the indents through imaging. Overall, 10 different codes were marked in 4×4 grids on each of the tested items. Each code contained 8 indents, for a total of 80 indents in each material. FIG. 8A shows the encoded pattern of indents and absence of indents for one of the copper items, while FIG. 8B shows the binary representation of the encoded pattern in the corresponding grid. As discussed above, code can be represented by a binary string, with the binary string of the illustrated example being "1110010000101101." Indent recognition accuracy was 100% for all three of the tested materials, with no false positive indent identifications, for the initial set of indents, demonstrating reliable identification for the process (240 total indents).

The Shore D Durometer had a conical-shaped indenter tip, with a 30° tip. The increased surface area that each indent created can be calculated using equation (1), where r is the radius of the indent, and Θ is the tip angle of the indenter.

$$A_i = \pi r^2 \left( \sqrt{1 + \cot^2\left(\frac{\theta}{2}\right)} - 1 \right) \quad (1)$$

The percent increase in surface area can then be calculated as a function of grid spacing using equation (2), where d is the nominal grid spacing, and f is the percentage of grid locations with an indent. In the experiments, 50% of the grid locations had indents, so f=0.50.

$$p_{SA} = \frac{fA_i}{d^2} \times 100 \quad (2)$$

Results showing the increase in surface area created from the indents for acrylic and polycarbonate, using the Shore D Durometer and 1 mm grid spacing with 50% of grid locations with indents are given in Table 1. These are relatively hard plastics, so an even greater increase in surface area would be expected in softer plastics that would have larger indents from the hardness testing.

TABLE 1

PHT-980 Indents in Plastics

| Material | Hardness (Shore D) | Indent Radius | Percent Increase in Surface Area |
|---|---|---|---|
| Acrylic | 90.6 | 0.16 mm | 11.5% |
| Polycarbonate | 83.4 | 0.18 mm | 14.6% |

The PHT-6005 UCI hardness tester had a diamond indenter tip with an angle of 136°. The increased surface area created by an indent with this intender shape can be calculated using equation (3), where w is the width of the of the indent measured perpendicular to the edges, and Θ is the tip angle.

$$A_{i,t} = w^2 \left( \csc\left(\frac{\theta}{2}\right) - 1 \right) \quad (3)$$

The percent increase in surface area as a function of grid spacing and fill percentage can be calculated using equation (2) and equation (3) to calculate Ai. The increase in surface area for 1 mm grid spacing and 50% of grid locations with indents for copper is given in Table 2.

TABLE 2

PHT-6005 Indents in Copper

| Material | Hardness | Indent Width | Percent Increase in Surface Area |
|---|---|---|---|
| Copper | 110 HV | 0.31 mm | 0.38% |

As seen from the results above, the geometry of the indenter tip of a portable hardness tester has a large impact on the increase in surface area generated by the hardness testing indents. The main factor affecting the increase in surface area per indent is the tip angle of the indenter—the PHT-980 has a much smaller tip angle than the PHT-6005, resulting in deeper indents and a larger increase in surface area. Because of this, the geometry of the indenter tip should be considered when selecting a portable hardness tester to use for this process. However, the increase in surface area is not the only way that the indents improve joining. Indents of any shape serve to rough up the surface, creating better shear behavior (e.g., by increasing the material's static coefficient of friction), and thus enhancing the joining properties of the surface. Therefore, other factors should also be considered when selecting a portable hardness tester, such as indent size for the material that is being tested, and any minimum size or thickness requirements of the material being tested for the hardness tester.

Use of a Robotic Arm

One of the reasons to implement the methods described herein using a robotic arm is in order to make the process flexible, making marking on surfaces in different orientations and in harder-to-reach locations possible. The use of a programmable robotic arm may mean that no change of set-up is required when switching between parts. Instead, one simply would need to modify the program for the appropriate surface location, angle, and grid size. This approach may be particularly beneficial for additive manufactured parts, which often have complex geometry and are produced in small batch sizes. It may save considerable manufacturing time to be able to use the same setup when switching between parts. It also may allow for multiple sensors to be mounted to the robotic arm so that imaging of the indents can be performed in the same manufacturing step.

There are certain parameters that should be considered when implementing the disclosed methods with a robotic arm. The first consideration is the accuracy (not the repeatability, which is more important when the same point in space is accessed many times, as in mass production scenarios) of the robotic arm. This will affect the achievable spatial grid density in the hardness testing process. The grid spacing should be a minimum of double the positional accuracy of the robotic arm. This means that if the robotic arm can move to within a radius of 1 mm of given position, then the minimum grid spacing that can be used with that robotic arm is 2 mm. This is at the very limit of the robotic arm, and a better constraint may be a minimum grid spacing of 2.5 times the accuracy of the robotic arm in order to prevent overlap of indents and ensure suitable readability of the serialization code marked. However, it should be noted that increased grid spacing will decrease the percent increase in surface area from the indents for enhanced joining. Thus, it may be desirable to use the minimum grid spacing achievable with the robotic arm.

Another consideration is the ability of the robotic arm to provide sufficient force to generate accurate hardness readings. The portable hardness testers described herein are actuated by applying force into the material until the tip is sufficiently depressed in the material. If the force is inadequate to achieve this, the hardness readings will be inaccurate and inappropriate for material validation. The required force is dependent on the hardness tester that is being used, the angle of the material surface with respect to gravity, and the material that is being validated.

An example robotic arm that may be used for carrying out the disclosed methods is the WidowX250-6DOF robotic arm, which is a six-degree-of-freedom (6DOF) robotic arm composed of six revolute joints. Various other types of robotic arms suitable for the disclosed methods may be used in other embodiments. In some embodiments, the robotic arm may be controlled through the use of Python (NumPy and other standard libraries) using analytic solutions to the inverse kinematics to determine joint positions for any given position and orientation. In some embodiments, each motor may be controlled by an individual PID controller. The locations for a grid may be calculated by defining a starting location and a plane on which to mark the grid. Testing has been performed in the XY plane and the YZ plane, with the grid oriented along these respective axes. When more complex planes are tested, the grid orientation will also be required to define the mark locations.

CONCLUSION

Currently, nanoindentation typically is performed in a controlled test protocol, with a polished surface of the material being indented from above, and with the indenter moving downward in the direction of gravity. The directional element is not guaranteed in a realistic manufacturing environment. According to the disclosed methods, the indentation of a material may be corrected for the angle with respect to gravity. In this manner, the methods may allow for omnidirectional angle of surface indentation. As described, the methods may use nanoindentation to validate a material at a surface of a manufactured/assembled good; that is, before the surfaces is bound or adhered to another surface. In this manner, material validation may be performed as a step of the manufacturing process. According to the disclosed methods, a nanoindenter may be used to intentionally encode information at a surface of a physical item, for example, using an equidigit coding scheme, for mass serialization. Further, the disclosed methods may use nanoindentation to create a manufacturing step with sufficient entropy to enable forensic identification of an individual part and process.

A potential application of the disclosed methods is in the binding of parts manufactured using dissimilar processes, such as bonding of an injection molded part to an additive manufactured part. In many cases, additive manufacturing can be used to design more streamlined and complex parts. However, size constraints and other limitations in the additive manufacturing process can be limiting to the parts that can be manufactured. This can be solved through joining of additive manufactured parts to parts manufactured through other means to maintain the complexity afforded through additive manufacturing, while avoiding the additive manufacturing process limitations. All four of the functionalities discussed above (material validation, serialization, forensic identification, and enhanced joining) are relevant to this use case. Additionally, in the case of part failure, the disclosed methods may be helpful in determining the forensics of the failure. For example, indentations which are no longer readable may be indicative of stress concentration during failure, which information may help identify vulnerabilities in the manufacturing processes taken. Finally, the disclosed methods could be used for asserting copyright, similar to a watermark, with the only feasible means of removal being cost-prohibitive for would-be fraudulent agents. The indentations may be small enough to be nearly invisible to the casual observer, but under high-resolution imaging may be used to verify the origins of a part.

Although specific embodiments of the disclosure have been described, one of ordinary skill in the art will recognize that numerous other modifications and alternative embodiments are within the scope of the disclosure. Further, while various illustrative implementations have been described in accordance with embodiments of the disclosure, one of ordinary skill in the art will appreciate that numerous other modifications to the illustrative implementations described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

What is claimed is:

1. A method for indentation of physical items, the method comprising:
forming, via an indenter, a plurality of first indents in a first surface of a first physical item, wherein the first indents are disposed within a first defined region of the first surface and arranged in a first encoded pattern corresponding to a first item-specific serialization code for the first physical item; and
validating a first material of the first physical item based at least in part on the first indents.

2. The method of claim 1, wherein the indenter is mounted to a robotic arm, and wherein forming, via the indenter, the plurality of first indents in the first surface of the first physical item comprises using the robotic arm to move the indenter relative to the first physical item.

3. The method of claim 1, wherein the indenter is a nanoindenter, and wherein the first indents are nanoindents.

4. The method of claim 1, wherein the first physical part is an additive manufactured part.

5. The method of claim 1, wherein the first defined region comprises a grid comprising a plurality of first grid regions each containing one of the first indents and a plurality of second grid regions without any indents contained therein.

6. The method of claim 5, wherein the first encoded pattern follows an equidigit coding scheme such that a number of the first grid regions is equal to a number of the second grid regions.

7. The method of claim 1, wherein the first item-specific serialization code is a binary string.

8. The method of claim 1, wherein validating the first material of the first physical item based at least in part on the first indents comprises determining a hardness of the first material.

9. The method of claim 8, wherein determining the hardness of the first material comprises:
determining an average depth of the first indents; and
calculating the hardness of the first material based at least in part on the average depth of the first indents.

10. The method of claim 8, wherein determining the hardness of the first material comprises:
determining an average size of the first indents; and
calculating the hardness of the first material based at least in part on the average size of the first indents.

11. The method of claim 10, wherein determining the average size of the first indents comprises:
capturing an image of the first indents; and
analyzing the image to determine the average size of the first indents.

12. The method of claim 8, wherein determining the hardness of the material comprises:
determining an angle of approach of the indenter to the first physical item relative to a direction of gravity in forming the first indents;
determining an average size of the first indents; and
calculating the hardness of the material based at least in part on the angle of approach, the average size of the first indents, and a calibration curve of indent size as a function of angle of approach.

13. The method of claim 1, further comprising joining the first physical item and a second physical item such that the first surface of the first physical item is adhered or bonded to a second surface of the second physical item and such that the first defined region of the first surface is covered by the second surface.

14. The method of claim 13, further comprising, prior to joining the first physical item and the second physical item, forming, via the indenter, a plurality of second indents in the second surface of the second physical item, wherein the second indents are disposed within a second defined region of the second surface and arranged in a second encoded pattern corresponding to a second item-specific serialization code for the second physical item, and wherein the first defined region of the first surface is covered by the second defined region of the second surface.

15. The method of claim 14, wherein each of the first encoded pattern and the second encoded pattern follows an equidigit coding scheme.

16. The method of claim 14, wherein the second encoded pattern complements the first encoded pattern such that none of the second indents overlap any of the first indents.

17. The method of claim 14, further comprising, prior to joining the first physical item and the second physical item, validating a second material of the second physical item based at least in part on the second indents.

18. The method of claim 1, further comprising forensically identifying the first physical item based at least in part on one or more attributes of one or more of the first indents in a manner such that a chance of false identification is less than one in a billion.

19. The method of claim 18, wherein the one or more attributes comprise one or more of: locations of the one or more of the first indents, orientations of the one or more of the first indents, sizes of the one or more of the first indents, and edge variations of the one or more of the first indents.

20. The method of claim 18, wherein forensically identifying the first physical item based at least in part on the one or more attributes of the one or more of the first indents comprises:
capturing an image of the first indents; and
analyzing the image to determine the one or more attributes of the one or more of the first indents.

\* \* \* \* \*